United States Patent
Tanaka et al.

(10) Patent No.: US 8,577,365 B2
(45) Date of Patent: Nov. 5, 2013

(54) MOBILE COMMUNICATION TERMINAL

(75) Inventors: Itsuma Tanaka, Yokohama (JP); Masashi Kanauchi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 14 days.

(21) Appl. No.: 13/057,847

(22) PCT Filed: Aug. 4, 2009

(86) PCT No.: PCT/JP2009/063809
§ 371 (c)(1), (2), (4) Date: May 6, 2011

(87) PCT Pub. No.: WO2010/016491
PCT Pub. Date: Feb. 11, 2010

(65) Prior Publication Data
US 2011/0207458 A1    Aug. 25, 2011

(30) Foreign Application Priority Data

Aug. 7, 2008 (JP) ............... P2008-204545
Aug. 22, 2008 (JP) ............... P2008-214334

(51) Int. Cl.
*H04W 4/00* (2009.01)
*H04W 36/00* (2009.01)

(52) U.S. Cl.
USPC ......... 455/435.1; 455/437; 370/331; 370/338

(58) Field of Classification Search
USPC ................................. 455/435.1
See application file for complete search history.

(56) References Cited

FOREIGN PATENT DOCUMENTS

| JP | 2007 201923 | 8/2007 |
| JP | 2008 135934 | 6/2008 |

OTHER PUBLICATIONS

International Preliminary Report on Patentability and Written Opinion issued on Mar. 17, 2011 in corresponding International Application No. PCT/JP2009/063809 filed on Aug. 4, 2009.

(Continued)

*Primary Examiner* — Lester Kincaid
*Assistant Examiner* — Andy Gu
(74) *Attorney, Agent, or Firm* — Oblon, Spivak, McClelland, Maier & Neustadt, L.L.P.

(57) ABSTRACT

A mobile communication terminal includes a location registration request unit 120 that makes a location registration request for a location registration in each of the mobile communication networks 200 and 300 to a 3.9G network 300, a location registration response receiving unit 130 that receives a location registration response representing a result of the location registration in the both mobile communication networks 200 and 300 in response to the request for the location registration, a location registration determination unit 140 that determines whether or not the location registration only in the 3.9G network 300 between the both mobile communication networks 200 and 300 is completed, based on the location registration response, and a first mobile communication network switching control unit 150 that performs a switching control of the mobile communication network for causing the mobile communication terminal 100 to be resident in the 2G/3G network 200 in a case where the location registration determination unit 140 determines that the location registration only in the 3.9G network 300 is completed.

14 Claims, 9 Drawing Sheets

(56) References Cited

OTHER PUBLICATIONS

3GPP TS 23.272 V8.0.0, "3rd Generation Partnership Project; Technical Specification Group Services and System Aspects; Circuit Switched Fallback in Evolved Packet System; Stage 2 (Release 8)", GSM, pp. 1-41, (Jun. 2008).
3GPP TS 23.272 V8.4.0, "3rd Generation Partnership Project; Technical Specification Group Services and System Aspects; Circuit Switched Fallback in Evolved Packet System; Stage 2 (Release 8)", LTE, pp. 1-48, (Jun. 2009).
3GPP TS 23.221 V8.1.0, "3rd Generation Partnership Project; Technical Specification Group Services and System Aspects; Architectural Requirements (Release 8)", pp. 1-39, (Jun. 2009).
3GPP TS 23.221 V8.4.0, "3rd Generation Partnership Project; Technical Specification Group Services and System Aspects; Architectural Requirements (Release 8)", LTE, pp. 1-46, (Jun. 2009).
International Search Report issued Nov. 10, 2009, in PCT/JP09/063809 filed Aug. 4, 2009.
Extended European Search Report issued Nov. 26, 2012 in Patent Application No. 09804974.5.
T-Mobile International et al., "Requirement on support of CS Fallback", 3rd Generation Partnership Project (3GPP), Mobile Competence Centre; 650, Route Des Lucioles, 3GPP Draft; S1-082386; F-06921 Sophia-Antipolis Cedex;France, vol. RAN WG3, no. Jeju Island; Aug. 1, 2008, XP050165414, Aug. 1, 2008, 3 pages.
Nokia Siemens Networks, "Combined attach clarification due to SMS over SGs interworking", 3rd Generation Partnership Project (3GPP), Mobile Competence Centre; 650, Route Des Lucioles, 3GPP Draft; S2-095232-DS on Voice and SMS-R9. Final; F-06921 Sophia-Antipolis Cedex;France, no. Kyoto; Sep. 4, 2009, XP050396731, Jul. 8, 2009, 9 pages.
Office Action issued Jan. 4, 2013, in Chinese Application No. 2009/80130377.6 with English language translation.
NTT DoCoMo, NEC "[CR; TS 24.301] combined EPS/IMSI attach procedures", 3GPP TSG CT WG1 Meeting #53 C1-082111, May 9, 2008, pp. 1-5.
Nokia Siemens Networks, Nokia, "Psuedo—CR on coding of the Attach result and Attach type information element", 3GPP TSG CT WG1 Meeting #54 C1-082634, Jun. 27, 2008.
Chinese Office Action in counterpart Chinese Patent Application No. 200980130377.6 dated Aug. 7, 2013, with an English translation provided by the Japan Patent Office.
Chinese Office Action in counterpart Chinese Patent Application No. 200980130377.6 dated Aug. 7, 2013, with an English translation provided by a representative in China.

*Fig.5*

| PROVIDER ID | CSFB COMPATIBILITY TABLE |
|---|---|
| A COMPANY | COMPATIBLE |
| B COMPANY | INCOMPATIBLE |
| C COMPANY | COMPATIBLE |

MOBILE COMMUNICATION TERMINAL

TECHNICAL FIELD

The present invention relates to a mobile communication terminal capable of being resident in two mobile communication networks.

BACKGROUND ART

As a mobile communication network in the related art, there are 2G (2nd Generation) network such as a GERAN and 3G (3rd Generation) network such as an UTRAN. In the conventional 2G/3G networks, both voice call and data communication services are provided, but 3.9G (3.9 Generation) network such as an E-UTRAN have been under review to realize a faster high-speed data communication. Since a main object of the 3.9G network is to provide a high-speed data communication service, to perform a voice call by paging the voice call service to a mobile communication terminal resident in the 3.9G network, as shown in FIG. 9, it is necessary that when a voice call paging is received from a network (S901 of FIG. 9), mobile communication network in which the mobile communication terminal is resident needs to be transitioned from the 3.9G network to the 2G/3G network (S902 of FIG. 9), makes a response on the voice call to the network via 2G/3G network (S903 of FIG. 9) and receives the voice call service using the 2G/3G network (S904 of FIG. 9). Such switching of the mobile communication network is referred to as CS (Circuit Switched) fallback (see Non patent Literature 1), and a CS fallback-compatible mobile communication terminal has been developed.

PRIOR ART LITERATURE

Non Patent Literature

Non Patent Literature 1: 3GPP Specification detail, 3GPP TS 23.272, Circuit Switched (CS) fallback in Evolved Packet System (BPS); Stage 2

SUMMARY OF INVENTION

Problem to be Solved by Invention

However, to perform the CS fallback, it is necessary that MSC/VLR (Mobile Switching Center/Visited Location Register) and an MME (Mobility Management Entry) that controls the 3.9G network are connected to be compatible with each other (see FIG. 1). However, when a user moves from an area where a mobile communication is routinely performed to a different area (for example, a foreign country) and roaming is performed, for example, depending on an area where the communication is performed, even though the 2G/3G network and 3.9G network are managed by the same subscriber accommodation station, the MSC/VLR that controls the 2G/3G network and the MME that controls the 3.9G network may be independently managed without being connected to be compatible with each other, such that they may be incompatible with the CS fallback (see FIG. 2). In this case, a CS fallback-compatible mobile communication terminal is made to be resident only in an E-UTRAN of the 3.9G network in preference, and the transition to the 2G/3G network like the CS fallback is not performed and it is resident in the 3.9G network as it is, even though a voice call is received, such that there is a concern that it may not receive the voice call service.

The invention has been made to solve the above-described problems, and an object of the invention is to provide a mobile communication terminal that can suitably receive a voice call service in a communication network in which a case where it is impossible to receive the voice call service may be present like CS fallback-incompatible case.

Means for Solving the Problem

To achieve the above-described object, a mobile communication terminal according to the invention is a mobile communication terminal adapted to be selectively resident in both a first mobile communication network where a data communication and a voice call can be performed and a second mobile communication network where data communication faster than in the first mobile communication network can be performed, the mobile communication terminal being set to be preferentially resident in the second mobile communication network in a case where the data communication is performed and being adapted to switch the mobile communication network so as to be resident in the first mobile communication network in a case where the voice call is performed. The mobile communication terminal includes receiving means that receives network information representing a function of the second mobile communication network from the second mobile communication network; switching possibility determination means that determines that, based on the network information received by the receiving means, whether or not the second mobile communication network is a switchable mobile communication network where the mobile communication terminal can switch the mobile communication network so as to be resident in the first mobile communication network in a case of receiving a calling of a voice call during being resident in the second mobile communication network; and first mobile communication network switching control means that can perform the switching control of the mobile communication network for causing the mobile communication terminal to be resident in the first mobile communication network in a case where the switching possibility determination means determines that the second mobile communication network is not the switchable communication network.

According to this configuration, the first mobile communication network switching control means can perform the switching control of the mobile communication network, which causes the mobile communication terminal to be resident in the first mobile communication network. Due to such switching control, without being resident in the second mobile communication network of which location registration is preferentially performed at the time of performing a data communication, the mobile communication terminal can perform the switching of the mobile communication network to be resident in the first communication network of which location registration is not performed at that time, such that the mobile communication terminal can perform not only the data communication but also the voice call. That is, with respect to the mobile communication network in which a case where it is impossible to receive the voice call service may be present like a CSFB-incompatible case, the CSFB-compatible mobile communication terminal can suitably receive the voice call service. In addition, the switching control of the mobile communication network by the first mobile communication network switching means may be automatically performed in a case where the network switching possibility determination means determines that the second mobile communication network is not a switchable mobile communication network, or may be performed when a user of the mobile communication terminal is notified of the determination by the switching possibility determination means which represents that the second mobile communication network is not the switchable mobile communication network and the user selects the switching.

In addition, location registration request means that makes a request for a location registration in each of the mobile communication networks to the second mobile communication network may be further provided wherein the receiving means may receive, as the network information, a location registration response representing a result of the location registration in the both mobile communication networks in response to the request for the location registration made by the location registration request means, and the switching possibility determination means may determine that the second mobile communication network is not a switchable mobile communication network, in a case where the location registration response, which is received by the receiving means, represents that only the second mobile communication network completed the location registration between the both mobile communication networks. Since the switching possibility determination means determines whether or not the second mobile communication network is the switchable mobile communication network based on the received location registration response as the network information, it is possible to simply determine whether or not the second mobile communication network is a switchable mobile communication network, that is, a CS fallback-compatible mobile communication network by using existing information such as the location registration response.

In addition, the receiving means may receive notification information that is the network information from the second mobile communication network, and the switching possibility determination means may determine whether or not the second mobile communication network is the switchable mobile communication network, based on the notification information received by the receiving means. Since the switching possibility determination means determines whether or not the second mobile communication network is the switchable mobile communication network based on the received notification information as the network information, it is possible to simply and quickly determine whether or not the second mobile communication network is a switchable mobile communication network, that is, a CS fallback-compatible mobile communication network by using existing information such as the notification information.

In addition, notification means that notifies a user of the mobile communication terminal of the determination by the switching possibility determination means, which represents that the second mobile communication network is not the switchable mobile communication network; and input receiving means that receives an input indicating whether or not the switching control of the mobile communication network for causing the first mobile communication terminal to be resident in the first mobile communication network needs to be performed in response to the notification by the notification means may be further included. When the input receiving means receives an input indicating that the switching control of the mobile communication network needs to be performed so as to cause the mobile communication terminal to be resident in the first mobile communication network, the first mobile communication network switching control means may perform the switching control of the mobile communication network to cause the mobile communication terminal to be resident in the first mobile communication network. As a result, the switching into the first mobile communication network in the mobile communication terminal can be selected by a user of the mobile communication terminal.

In addition, residence prohibition means that prohibits the mobile communication terminal from being resident in the second mobile communication network when the mobile communication terminal is resident in the first mobile communication network as a result of the switching control by the first mobile communication network switching control means may be further included. By including the residence prohibition means, it is possible to cause the mobile communication terminal resident in the first mobile communication network not to be resident in the second mobile communication network where the voice call is not performed. As a result, in the CS fallback-incompatible mobile communication network, it is possible to cause the mobile communication terminal to be resident in the first communication network where the data communication and the voice call can be performed and the CS fallback-compatible mobile communication terminal can continuously receive the voice call service. The continuous residence of the first mobile communication network by the residence prohibition means may be surely performed by the mobile communication terminal including second mobile communication network switching control means that receives, from the first mobile communication network, a switching indication signal indicating a switching from the first mobile communication network to the second mobile communication network, and performs a switching control of the mobile communication network to cause the mobile communication terminal to be resident in the second mobile communication network, based on the switching indication signal wherein the residence prohibition means includes switching indication signal discarding means that discards the switching indication signal received by the second mobile communication network switching control means, before the second mobile communication network switching control means performs the switching control of the mobile communication network.

In addition, communication function switching means that can switch the communication function of the mobile communication terminal, which uses the second mobile communication network, into an off state, in a case where the switching possibility determination means determines that the second mobile communication network is not the switchable mobile communication network may be included. By including the communication function switching means, the communication function of the mobile communication terminal using the second mobile communication network is switched into an off state and thereby it is possible to stop the reception of the switching indication signal indicating the switching from the first mobile communication network to the second mobile communication network. As a result, with respect to the CS fallback-incompatible mobile communication network, it is possible to cause the mobile communication terminal to be continuously and stably resident in the first mobile communication network where the data communication and the voice call can be performed, such that the CS fallback-compatible mobile communication terminal can continuously and stably receive the voice call service. In addition, means that selects and set a communication mode where only the data communication can be performed or a communication mode where the both data communication and the voice call can be performed, and causes only the data communication through the second mobile communication network to be performed when the communication mode where only the data communication can be performed is set may be further included.

In addition, a mobile communication terminal according to the invention is a mobile communication terminal that can be selectively resident in both a first mobile communication network where a data communication and a voice call can be performed and a second mobile communication network where data communication faster than in the first mobile communication network can be performed, the Mobile communication terminal being set to be preferentially resident in the second mobile communication network in a case where the data communication is performed, and being adapted to switch the mobile communication network so as to be resident in the first mobile communication network in a case where the voice call is performed. The mobile communication terminal includes location registration request means that makes a request for a location registration in each of the mobile communication networks to the second mobile communication network; location registration response receiving means that receives a location registration response representing a result of the location registration in the both mobile communication networks in response to the request for the location registration made by the location registration request means; location registration determination means that determines whether or not the location registration only in the second mobile communication network between the both mobile communication networks is completed, based on the location registration response received by the location registration response receiving means; and first mobile communication network switching control means that can perform a switching control of the mobile communication network for causing the mobile communication terminal to be resident in the first mobile communication network, in a case where the location registration determination means determines that the location registration only in the second mobile communication network is completed.

According to this configuration, the first mobile communication network switching control means performs the switching control of the mobile communication network, which causes the mobile communication terminal to be resident in the first mobile communication network. Due to such switching control, without being resident in the second mobile communication network of which location registration is preferentially performed at the time of performing a data communication, the mobile communication terminal can perform the switching of the mobile communication network to be resident in the first communication network of which location registration is not performed at that time, such that the mobile communication terminal can perform not only the data communication but also the voice call. That is, with respect to the mobile communication network in which a case where it is impossible to receive the voice call service may be present like a CSFB-incompatible case, the CSFB-compatible mobile communication terminal can suitably receive the voice call service. In addition, the switching control by the first mobile communication network switching means may be automatically performed in a case where the location registration determination means determines that the location registration is completed only in the second mobile communication network, or may be performed when a user of the mobile communication terminal is notified of the determination by the location registration determination means, which represents that the location registration is completed only in the second mobile communication network, and the user selects the switching.

In addition, notification means that notifies a user of the mobile communication terminal of the determination by the location registration determination means, which represents that the location registration is completed only in the second mobile communication network; and input receiving means that receives an input indicating whether or not the switching control of the mobile communication network for causing the first mobile communication terminal to be resident in the first mobile communication network needs to be performed in response to the notification by the notification means may be further included. When the input receiving means receives an input indicating that the switching control of the mobile communication network needs to be performed so as to cause the mobile communication terminal to be resident in the first mobile communication network, the first mobile communication network switching control means may perform the switching control of the mobile communication network to cause the mobile communication terminal to be resident in the first mobile communication network. As a result, the switching into the first mobile communication network in the mobile communication terminal can be selected by a user of the mobile communication terminal.

In addition, communication function switching means that can switch the communication function of the mobile communication terminal, which uses the second mobile communication network, into an off state in a case where the location registration determination means determines that the location registration is completed only in the second mobile communication network may be included. By including the communication function switching means, the communication function of the mobile communication terminal using the second mobile communication network is switched into an off state and thereby it is possible to stop the reception of the switching indication signal indicating the switching from the first mobile communication network to the second mobile communication network. As a result, with respect to the CS fallback-incompatible mobile communication network, it is possible to cause the mobile communication terminal to be continuously and stably resident in the first mobile communication network where the data communication network and the voice call can be performed, such that the CS fallback-compatible mobile communication terminal can continuously and stably receive the voice call service.

Effect of Invention

With respect to the mobile communication network in which a case where it is impossible to receive the voice call service may be present like a CS fallback-incompatible case, the voice call service can be suitably received.

BRIEF DESCRIPTION OF DRAWINGS

FIG. 5 is a diagram illustrating data of a provider and a CSFB compatibility situation.

DESCRIPTION OF REFERENCE SYMBOLS

1 . . . CSFB-incompatible mobile communication system; 100, 600 . . . Mobile communication terminal; 120 . . . Location registration request unit; 130 . . . Location registration response receiving unit; 140 . . . Location registration determination unit; 150 . . . First mobile communication network switching control unit; 160 . . . Second mobile communication network switching control unit; 170 . . . Residence prohibition unit; 175 . . . Switching indication signal discarding unit; 180 . . . Communication function switching unit; 200 2G/3G network; 300 . . . 3.9G network; 620 . . . Notification information receiving unit; 640 . . . Network switching possibility determination unit

MODE FOR CARRYING OUT THE INVENTION

Figure 1:
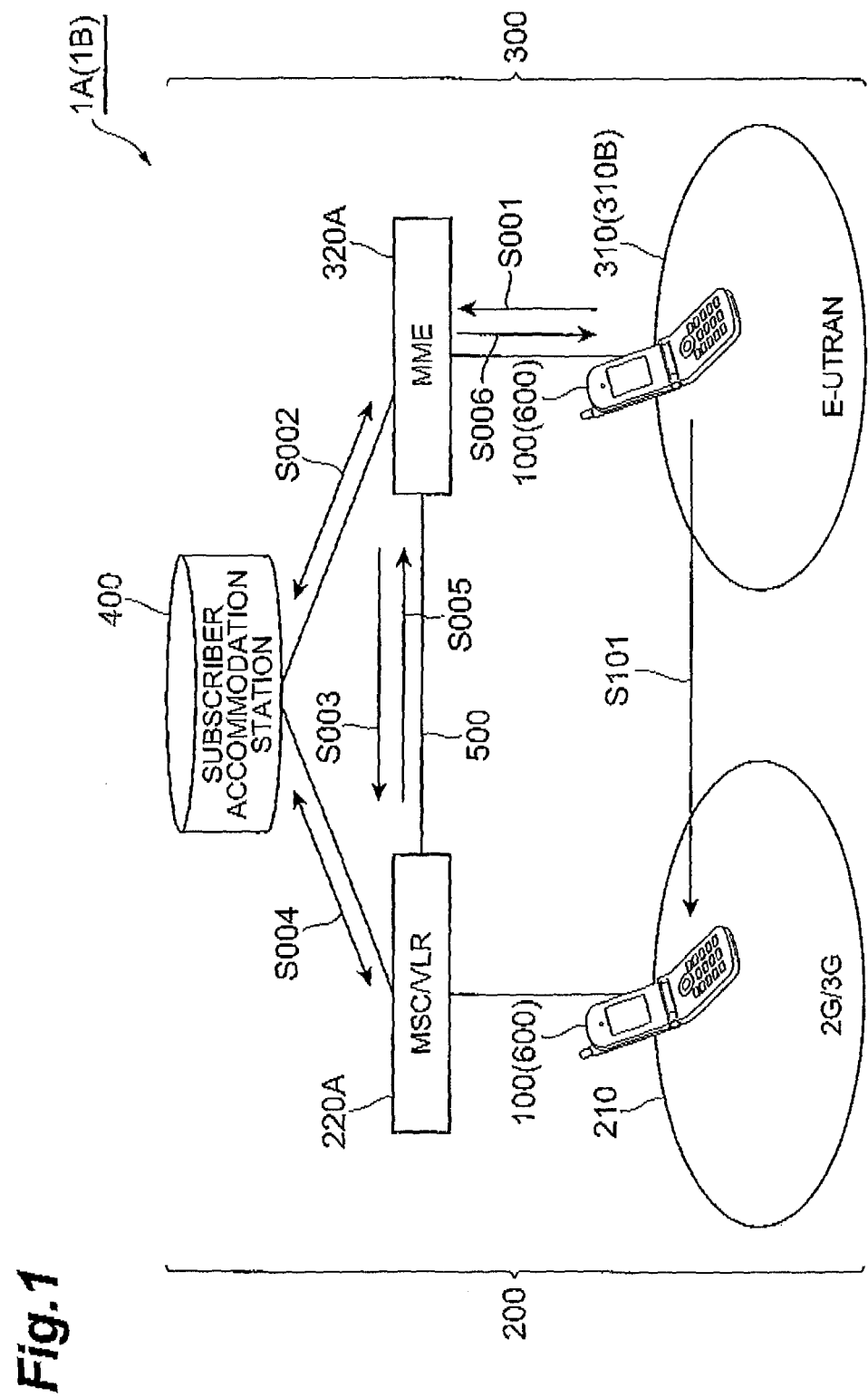
FIG. 1 is a schematic configuration diagram illustrating a CSFB-compatible mobile communication network according to a first embodiment.
Figure 2:
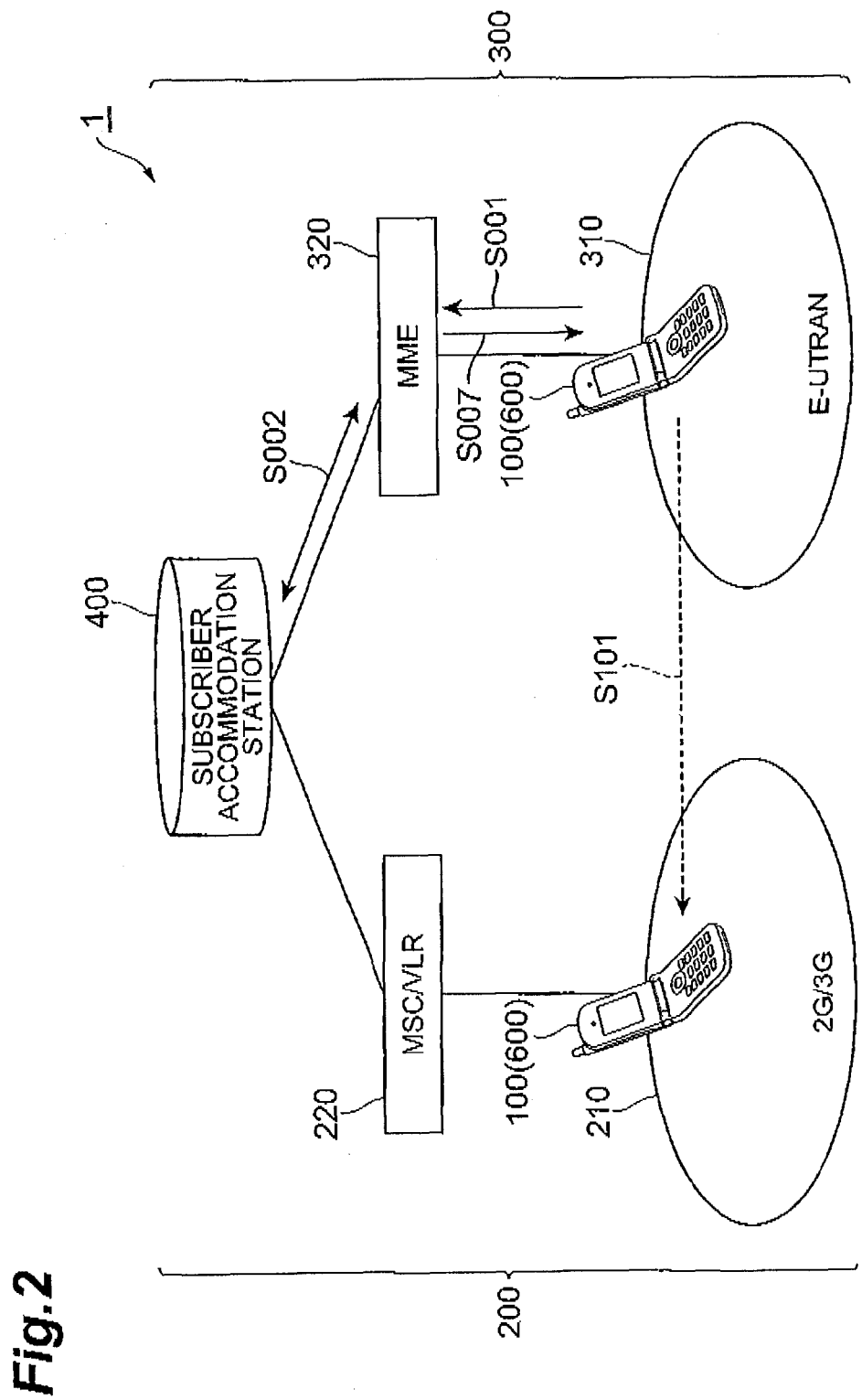
FIG. 2 is a schematic configuration diagram illustrating a CSFB-incompatible mobile communication network according to the first embodiment.

A mobile communication terminal according to the invention is a CS fallback (hereinafter, referred to as "CSFB")-compatible mobile communication terminal 100. First, a mobile communication network in which a voice call service and a data communication service can be received using the mobile communication terminal 100 will be described with reference to FIGS. 1 and 2. FIG. 1 shows a schematic configuration diagram illustrating a CSFB-compatible mobile communication network. FIG. 2 shows a schematic configuration diagram illustrating a CSFB-incompatible mobile communication network. In addition, like reference numerals will be given to like parts, and redundant description thereof will be omitted.

First Embodiment

First, a CSFB-compatible mobile communication system 1A will be described. As shown in FIG. 1, the CSFB-compatible mobile communication system 1A includes both mobile communication networks of 2G/3G network 200 (first mobile communication network) such as a GERAN and an UTRAN and 3.9G network 300 (second mobile communication network) such as an E-UTRAN. The 2G/3G network 200 that is one of the both mobile communication networks includes: a wireless network 210 of GERAN/UTRAN that performs a mobile communication between a subscriber accommodation station 400, which stores subscriber information including location registration information and contract information of each of a plurality of mobile communication terminals including the mobile communication terminal 100 and a plurality of mobile communication terminals including the mobile communication terminal 100; and a plurality of MSC/VLRs 220A each making up control unit that is connected to the subscriber accommodation station 400 and the wireless network 210 to control the 2G/3G network 200. The 2G/3G network 200 having such a configuration provides a voice call service and a data communication service to a mobile communication terminal that has a function of connecting to the 2G/3G network.

The 3.9G network 300, which is another mobile communication network, includes: a wireless network 310 of E-UT-RAN, which performs a mobile communication between the subscriber accommodation station 400 commonly shared with the 2G/3G network 200 and a plurality of mobile communication terminals including the mobile communication terminal 100; and a plurality of MMEs 320A each making up a control unit that is connected to the subscriber accommodation station 400 and the wireless network 310 to control the 3.9G network 300. The 3.9G network 300 having such a configuration provides a data communication service faster than the 2G/3G network 200 to a mobile communication terminal having a function of connecting to the 3.9G network. However, in the 3.9G network 300, the voice call service by a line switching is not provided. In addition, in FIG. 1 and the other figures, to facilitate understanding of the explanation, the 2G/3G network 200 and the 3.9G network 300 are described as being apparently divided. However, in practice, the mobile communication networks 200 and 300 are formed to be overlapped in a predetermined area, and the overlapped area has a radio wave status in which it is possible to receive the services from the both mobile communication networks 200 and 300.

In addition, the plurality of MSC/VLRs 220A that controls the 2G/3G network 200 and the plurality of MMEs 320A that controls the 3.9G network are not only connected to the subscriber accommodation station 400, but also are connected to each other via a line 500 and have a function of correlating each location registration information of the mobile communication terminals resident in the mobile communication networks 200 and 300. Therefore, in a mobile communication terminal such as the mobile communication terminal 100, which has a function of receiving notification information from the mobile communication networks 200 and 300 and connecting to the mobile communication networks 200 and 300, when receiving a data communication service, it is preferentially resident in the 3.9G network 300 to perform a high-speed data communication, and when receiving a voice call service, it performs the CSFB (see S101 of FIG. 1) to be resident in the 2G/3G network 200 and thereby performs a voice call. In addition, it is necessary to have separate communication functions to connect each of the 2G/3G network 200 and the 3.9G network 300, such that the mobile communication terminal 100 has communication functions of connecting the mobile communication networks 200 and 300, respectively.

Here, in the CSFB-compatible mobile communication system 1A, a sequence in which the CSFB-compatible mobile communication terminal 100 performs a location registration will be described with reference to FIG. 1. First, CSFB location registration request signal is transmitted from the CSFB-compatible mobile communication terminal 100 to the MME 320A of 3.9G network 300 (S001 of FIG. 1). The MME 320A, which received the CSFB location registration request signal, makes a request for location registration to the subscriber accommodation station 400 in which subscriber information including location registration information and contract information of each of the mobile communication terminal are stored (S002 of FIG. 1). The subscriber accommodation station 400, which received the location registration request, performs a location registration in the 3.9G network 300, and then transmits the subscriber information such as the contract information of the mobile communication terminal 100 that made a request for location registration to the MME 320A (S002 of FIG. 1). A line identifier (S-TMSI) of the E-UTRAN is generated in the MME 320A by performing the location registration, and is included in a response signal to be described later. The line identifier of the E-UTRAN is included in the response signal as described above, and this indicates that the location registration in the 3.9G network 300 is completed.

In addition, the MME 320A, which received the CSFB location registration request signal, makes a request for location registration to the MSC/VLR 220A via the line 500 (S003 of FIG. 1). The MSC/VLR 220A, which received the location registration request, makes a request for location registration in the 2G/3G network 200 to the subscriber accommodation station 400 (S004 of FIG. 1). The subscriber accommodation station 400, which received the location registration request, performs the location registration in the 2G/3G network 200 and then transmits subscriber information such as contract information of the mobile communication terminal 100, which made the request for location registration, to the MSC/VLR 220A (S004 of FIG. 1). Line identifiers (TMSI and CS-IMSI) of UTRAN and GERAN are generated in the MSC/VLR 220A by performing the location registration. The MSC/VLR 220A, which generated the line identifiers, transmits a response signal of the location registration of the mobile communication terminal 100 in the 2G/3G network 200 to the MME 320A through the line 500 (S005 of FIG. 1). The line identifiers (TMSI and CS-IMSI) of the UTRAN and the GERAN are included in the response signal by the MSC/VLR 220A. The line identifiers are included as described above, and this indicates that the location registration in the 2G/3G network 200 is completed.

Subsequently, the MME 320A generates a location registration response signal including the both line identifiers of the line identifier of E-UTRAN, which is generated in response to the location registration in step S002 and the line identifiers of UTRAN and GERAN, which are acquired in step S005. The MME 320A transmits the location registration response signal to the mobile communication terminal 100 (S006 of FIG. 1). Accordingly, the mobile communication terminal 100 capable of receiving notification information from the both mobile communication networks 200 and 300 is set to be resident in the both mobile communication networks 200 and 300, and can perform the switching of mobile communication network such as the CSFB.

Subsequently, a CSFB-incompatible mobile communication system 1 will be described. As shown in FIG. 2, the CSFB-incompatible mobile communication system 1 has the same configuration as that of the CSFB-compatible mobile communication terminal 1A except that it has no function of correlating the location registration information or the like of the mobile communication terminal resident in the both mobile communication terminals 200 and 300 in order to correlate with each other through the line 500. Since the CSFB-incompatible mobile communication system 1 does not have the location registration information correlating function, each of the 2G/3G network 200 and the 3.9G network 300 forms a mobile communication network, independently. In the above-described CSFB-incompatible mobile communication system 1, a sequence in which the CSFB-compatible mobile communication terminal 100 performs a location registration will be described with reference to FIG. 2. An MSC/VLR 220 and an MIME 320 shown in FIG. 2 have the same configuration as that of the MSC/VLR 220A and the MME 320A except for the location registration information correlating function.

First, the CSFB-compatible mobile communication terminal 100 transmits the CSFB location registration request signal to the MME 320 of the 3.9G network 300 (S001 of FIG. 2). The MME 320, which received the CSFB location registration request signal, makes a request for location registration in the 3.9G network to the subscriber accommodation station 400 (S002 of FIG. 2). The subscriber accommodation station 400, which received the location registration request, performs the location registration in the 3.9G network 300, and then transmits subscriber information such as contract information of the mobile communication terminal 100, which made the request for location registration, to the MIME 320 (S002 of FIG. 2). As is the case with the CSFB-compatible mobile communication terminal 1A, a line identifier of the E-UTRAN is generated by performing the location registration.

Subsequently, since the MME 320, which received the CSFB location registration request signal, does not have the location information correlating function, differently from the CSFB-compatible mobile communication system 1A, the MME 320 does not perform a process with respect to the signal related to the request for location registration in the 2G/3G network 200. As a result, the location registration in the 2G/3G network 200 is not performed, and the MME 320 generates a location registration response signal including only the line identifier of the E-UTRAN in response to the location registration in step S002. And then, the MME 320 transmits a location registration response signal thereof to the mobile communication terminal 100 (S007 of FIG. 2).

The mobile communication terminal 100 is set to be resident only in the 3.9G network by the location registration response signal including only the line identifier of the E-UTRAN, such that it may not perform the above-described switching of mobile communication network, and thereby may not receive the voice call service by CSFB. In addition, even though having a communication function of receiving notification information from the both mobile communication networks 200 and 300, the CSFB-compatible mobile communication terminal 100 is set to be preferentially resident in the 3.9G network 300. Therefore, in the CSFB-incompatible mobile communication system 1, the mobile communication terminal 100 is resident in the 3.9G network 300 before being resident in the 2G/3G network 200. In addition, since in the 2G/3G network 200, an outgoing calling for the mobile communication terminal 100 is not performed via the 3.9G network 300, it is impossible for the mobile communication terminal 100 to be resident in the 2G/3G network 200.

However, the mobile communication terminal 100 according to this embodiment has a function described below to countermeasure the above-described condition and can receive the voice call service in the CSFB-incompatible mobile communication system 1. Hereinafter, the mobile communication terminal 100 capable of also receiving the voice call service even in the CSFB-incompatible mobile communication system 1 will be described in detail. In addition, as described above, the mobile communication terminal 100 can receive the data communication service and the voice call service through the CSFB in the CSFB-compatible mobile communication system 1A.

Figure 3:
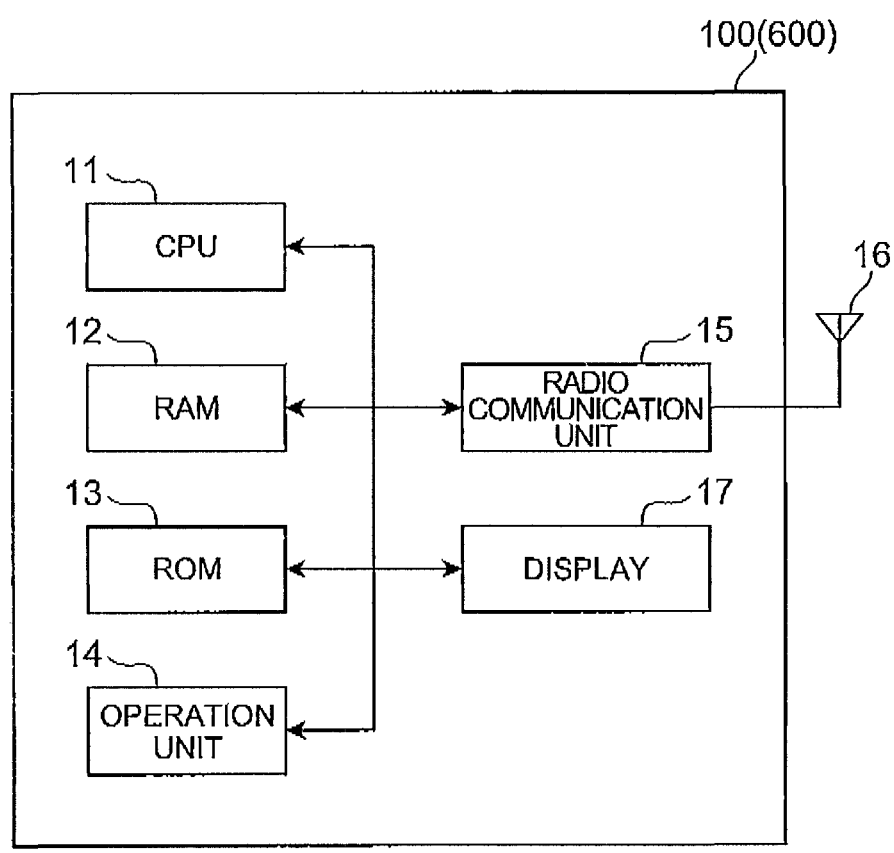
FIG. 3 is a diagram illustrating hardware configuration of a mobile communication terminal.

The CSFB-compatible mobile communication terminal 100 will be described. FIG. 3 shows a diagram illustrating a hardware configuration of a mobile communication terminal 100. As shown in FIG. 3, the mobile communication terminal 100 is constructed as a general computer system that physically includes a CPU 11, a main storage device such as a RAM 12 and a ROM 13, an operation unit 14 such as a keypad, a radio communication unit 15 performing a radio communication with the mobile communication systems 1 and 1A, an antenna unit 16 for a mobile communication, and a display 17 that displays predetermined information to visually notify a user of the information. Each function of the mobile communication terminal 100, which will be described later, may be realized in a manner in which the hardware such as the CPU 11, the RAM 12 and the ROM 13 is caused to read computer software and thereby the mobile communication unit 15 and the display 17 operate under the control of the CPU 11 while data is being read from and written in the main storage units 12 and 13.

Figure 4:
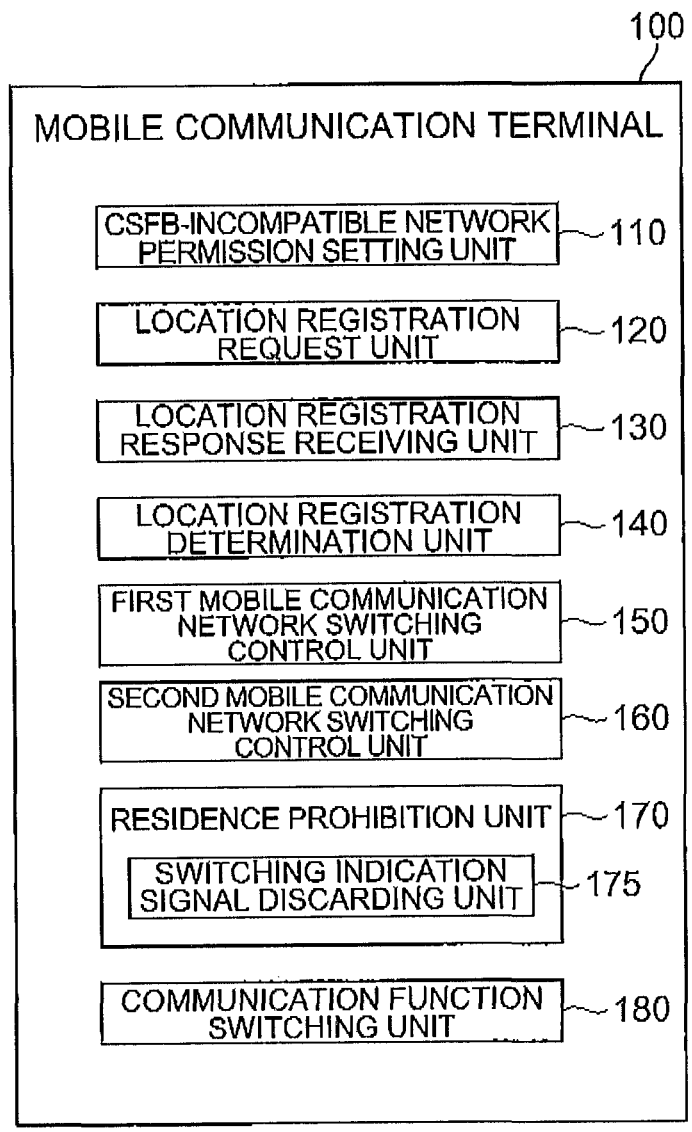
FIG. 4 is a schematic configuration diagram illustrating a mobile communication terminal according to the first embodiment.

FIG. 4 shows a schematic configuration diagram illustrating the mobile communication terminal 100. As shown in FIG. 4, The mobile communication terminal 100 functionally includes a CSFB-incompatible network permission setting unit 110, a location registration request unit (location registration request means) 120, a location registration response receiving unit (location registration response receiving means, receiving means) 130, a location registration determination unit (location registration determination, means, switching possibility determination means) 140, a first mobile communication network switching control unit (first mobile communication network switching control means) 150, a second mobile communication network switching control unit (second mobile communication switching control means) 160, a residence prohibition unit (residence prohibition means) 170, and a communication function switching unit (communication function switching means) 180. In addition, the residence prohibition unit 170 includes a switching indication signal discarding unit (switching indication signal discarding means) 175.

The mobile communication terminal 100 having such a configuration is a CSFB-compatible mobile communication terminal that can be selectively resident in the 2G/3G network 200 where it is possible to perform data communication and a voice call and the 3.9G network 300 where it is possible for the mobile communication terminal 100 to perform a data communication faster than in the 2G/3G network 200, that can set to be preferentially resident in the 3.9G network 300 in a case of performing the data communication, and that can switch the mobile communication network to be resident in the 2G/3G network 200 by the CSFB in a case of performing the voice call. In addition, in the CSFB-incompatible mobile communication system 1 according to this embodiment, each of the 2G/3G network 200 and the 3.9G network 300 is present and the mobile communication terminal 100 can receive notification information from the both mobile communication networks 200 and 300, respectively, such that when receiving a voice call service by each function described below, the mobile communication terminal 100 can be resident in the 2G/3G network 200 without performing the CSFB. In addition, depending on an area where roaming is performed, only the 3.9G network 300 may be present in a mobile communication network. In this case, it is impossible to, of course, receive the voice call service. The mobile communication terminal 100 determines that the area is one in which the mobile communication terminal 100 cannot receive the voice call, when the mobile communication terminal 100 fails to receive notification information from the 2G/3G network 200.

In a case where the mobile communication terminal 100 is unknown whether the location of a user of the mobile communication terminal 100 is in an area corresponding to the CSFB-compatible mobile communication system 1A or an area corresponding to the CSFB-incompatible mobile communication system 1, the CSFB-incompatible network permission setting unit 110 sets whether a communication mode where only data communication can be performed needs to be selected or not. In a case where roaming is performed and thereby it is unknown whether the location of the user of the mobile communication terminal 100 is in an area corresponding to the CSFB-compatible mobile communication system 1A or an area corresponding to the CSFB-incompatible mobile communication system 1, the CSFB-incompatible network permission setting unit 110 displays, on a display or the like, choices such as a choice in which a communication mode where only a data communication can be performed and whether a communication mode where both data communication and voice communication can be performed, and sets the communication mode in advance according to a user's operation and stores the setting information of the communication mode that is set. Only high-speed data communication by the 3.9G network 300 is provided in a case where the stored communication mode is a communication mode where only data communication is performed and where a mobile communication system in which the mobile communication terminal 100 is resident is the CSFB-incompatible mobile communication system 1.

In addition, low-speed data communication by 2G/3G network 200 and general voice communication are provided by each function described below in a case where the stored communication mode is a communication mode where the both data communication and the voice communication are performed and the mobile communication system in which the mobile communication terminal is resident is the CSFB-incompatible mobile communication system 1. In addition, in a case where the stored communication mode is a communication mode where the both data communication and the voice call communication are performed and the mobile communication system in which the mobile communication terminal 100 is resident is the CSFB-compatible mobile communication system 1A, as is the case with the related art, the high-speed data communication by the 3.9G network 300 and general voice communication by the CSFB are provided. The CSFB-incompatible network permission setting unit 110 outputs the stored communication mode setting information to the location registration determination unit 140. In addition, at the time of selecting the communication mode, a provider ID (PLMN-ID) included in the notification information transmitted from the mobile communication networks 200 and 300 or the like is compared with a CSFB compatibility situation of each provider which is stored in the mobile communication terminal 100 (see FIG. 5). If the mobile communication system in which the mobile communication terminal 100 is determined as the CSFB-compatible mobile communication system 1A, it may be automatically set to select the communication mode where the both data communication and the voice communication can be performed. In addition, it may be set to prompt a user to select the above-described communication mode in the CSFB-incompatible network permission setting unit 110, only in a case where the mobile communication system is determined as the CSFB-incompatible mobile communication system 1.

The location registration request unit 120 makes a request for the location registration of the CSFB in the both mobile communication networks 200 and 300 to the 3.9G network 300. The location registration request unit 120 makes a request for the location registration of the CSFB to register the location of the CSFB in each of both mobile communication networks of the 2G/3G networks 200 and the 3.9G network 300 to the MME 320 of the 3.9G network 300 (see 5001 of FIGS. 1 and 2). In addition, the location registration request unit 120 also has a function of directly making an individual request for the location registration to the 2G/3G network 200.

The location registration response receiving unit 130 receives a location registration response representing the result of the location registration of the CSFB in the both mobile communication networks 200 and 300. The location registration response receiving unit 130 receives the location registration response representing the result of the location registration of the CSFB in the both mobile communication networks 200 and 300, from the MME 320 of the 3.9G network 300, in response to the request for the location registration of the CSFB by the location registration request unit 120 (S006 of FIGS. 1 and 5007 of FIG. 2). The location registration response receiving unit 130 outputs the received location registration response to the location registration determination unit 140.

The location registration determination unit 140 determines whether or not the mobile communication terminal 100 is resident in the CSFB-incompatible mobile communication system 1 by determining whether or not the location registration only in the 3.9G network 300 between the both mobile communication networks 200 and 300 is completed. When receiving the setting information such as the selection of a communication mode where the both data communication and the voice communication can be performed and the like from the CSFB-incompatible network permission setting unit 110 and receiving allocation registration response from the location registration response receiving unit 130, the location registration determination unit 140 extracts a line identifier included in the location registration response input from the location registration response receiving unit 130. The location registration determination unit 140 confirms whether or not the extracted line identifier is only the line identifier (S-TMSI) of the E-UTRAN, determines that the location registration is completed only in the 3.9G network 300 between the both mobile communication networks when only the line identifier of the E-UTRAN is present, and determines that the mobile communication system in which the mobile communication terminal is resident is a CSFB-incompatible mobile communication system 1. In addition, when the extracted line identifier includes the identifiers (TMSI, CS-IMSI) of the UTRAN and the GERAN, this represents that the location registration of the 2G/3G network 200 is also completed. In this case, the location registration determination unit 140 determines that the mobile communication network in which the mobile communication terminal is resident is the CSFB-compatible mobile communication system 1A. In a case where the mobile communication system in which the mobile communication terminal is resident is the CSFB-incompatible mobile communication system 1, and the setting information from the CSFB-incompatible network permission setting unit 110 represents the selection of the communication mode where the both data communication and the voice communication can be preformed, the location registration determination unit 140 outputs a mobile communication network switching indication signal to the first mobile communication network switching control unit 150.

In a case where it is determined that the mobile communication terminal 100 is resident in CSFB-incompatible mobile communication system 1, the first mobile communication network switching control unit 150 performs a switching control where the mobile communication network is automatically switched to cause the mobile communication terminal 100 to be resident in the 2G/3G network 200 (Automatic HIV Selection). When receiving a switching indication signal from the location registration determination unit 140, the first mobile communication network switching control unit 150 transmits to the resident 3.9G network 300 (including the subscriber accommodation station 400) a switching indication signal indicating the compulsory switching of the mobile communication network to the 2G/3G network 200, and performs a switching control process of the mobile communication network to cause the mobile communication terminal 100 to be resident in the 2G/3G network 200. The mobile communication network switching control process may be performed by the same method as that of the mobile communication network switching control process in the related art.

The second mobile communication network switching control unit 160 performs the switching control of switching a mobile communication network to a 3.9G network. The second mobile communication network switching control unit 160 receives, from the subscriber accommodation station 400, a re-switching indication signal for switching again the mobile communication network to a 3.9G network after the first mobile communication network switching control unit 150 switches the mobile communication network to the 2G/3G network 200. The second mobile communication network switching control unit 160 controls the switching of the mobile communication network to cause the mobile communication terminal 100 to be resident in a 3.9G network based on the switching indication signal. In addition, as long as the mobile communication terminal 100 keeps the communication function that uses the 3.9G network 300 in an ON state, the re-switching indication signal is transmitted from the subscriber accommodation station 400 whenever the mobile communication terminal 100 moves to a wireless network managed by an adjacent MSC/VLR 220 beyond a wireless network managed by one MSC/VLR 220.

The residence prohibition unit 170 prohibits the switching of the mobile communication network to cause the mobile communication terminal 100 to be resident in a 3.9G network, when the mobile communication terminal 100 is made to be resident in the 2G/3G network 200 by the first mobile communication network switching control unit 150. The residence prohibition unit 170 includes, for example, a switching indication signal discarding unit 175. The switching indication signal discarding unit 175 performs a process of discarding the re-switching indication signal received by the second mobile communication network switching control unit 160 before the second mobile communication network switching control unit 160 performs the control of switching the mobile communication network in which the mobile communication terminal 100 is resident to the 3.9G network 300. The discarding process is performed whenever the switching indication signal is received. Due to the discarding process, the transmission from the 3.9G network 300 side is regulated, such that the mobile communication terminal 100 can be continuously resident in the 2G/3G network 200. In addition, even when the mobile communication terminal 100 is outside of the 2G/3G network 200 or the power of the mobile communication terminal 100 is turned off, the mobile communication terminal 100 stores and manages the information indicating the prohibition of switching to 3.9G network so as not to be transitioned to 3.9G network.

The communication function switching unit 180 switches off the communication function of the mobile communication terminal 100, which uses the 3.9G network 300. When the mobile communication terminal 100 is resident in the CSFB-incompatible mobile communication system 1 and the setting information transmitted from the CSFB-incompatible network permission setting unit 110 is determined as a communication mode where both data communication and voice communication can be performed, the communication function switching unit 180 switches the communication function of the mobile communication terminal 100, which uses the 3.9G network 300, from the on state to an off state. The mobile communication terminal 100 of which communication function using the 3.9G network 300 is switched into the off state may not receive any notification information from the 3.9G network 300 and thereby the reception of the re-switching signal is stopped. As a result, in a CS fallback-incompatible mobile communication network, the mobile communication terminal can be continuously and stably resident in the first mobile communication network capable of performing the data communication and the voice communication and the CS fallback-compatible mobile communication terminal can continuously and stably receive a voice call service.

Since the communication function switching unit 180 switches the communication function of the mobile communication terminal 100, which uses the 3.9G network 300, from the on state into an off state, even though the mobile communication terminal 100 moves to a wireless network managed by an adjacent MSC/VLR 220 beyond a wireless network managed by one MSC/VLR 220, the reception of the re-switching signal is stopped. In addition, the switching information where the communication function using the 3.9G network 300 is switched off by the communication function switching unit 180 is stored in the mobile communication terminal 100. Therefore, even when the power of the mobile communication terminal 100 is turned of and is turned on again once, if a provider ID included in the notification information received by the mobile communication terminal 100 is the same, the mobile communication terminal 100 is resident in the 2G/3G network 200 with the above-described function being kept off as it is. Therefore, the mobile communication terminal 100 is continuously and stably resident in the 2G/3G network 200.

Figure 6:
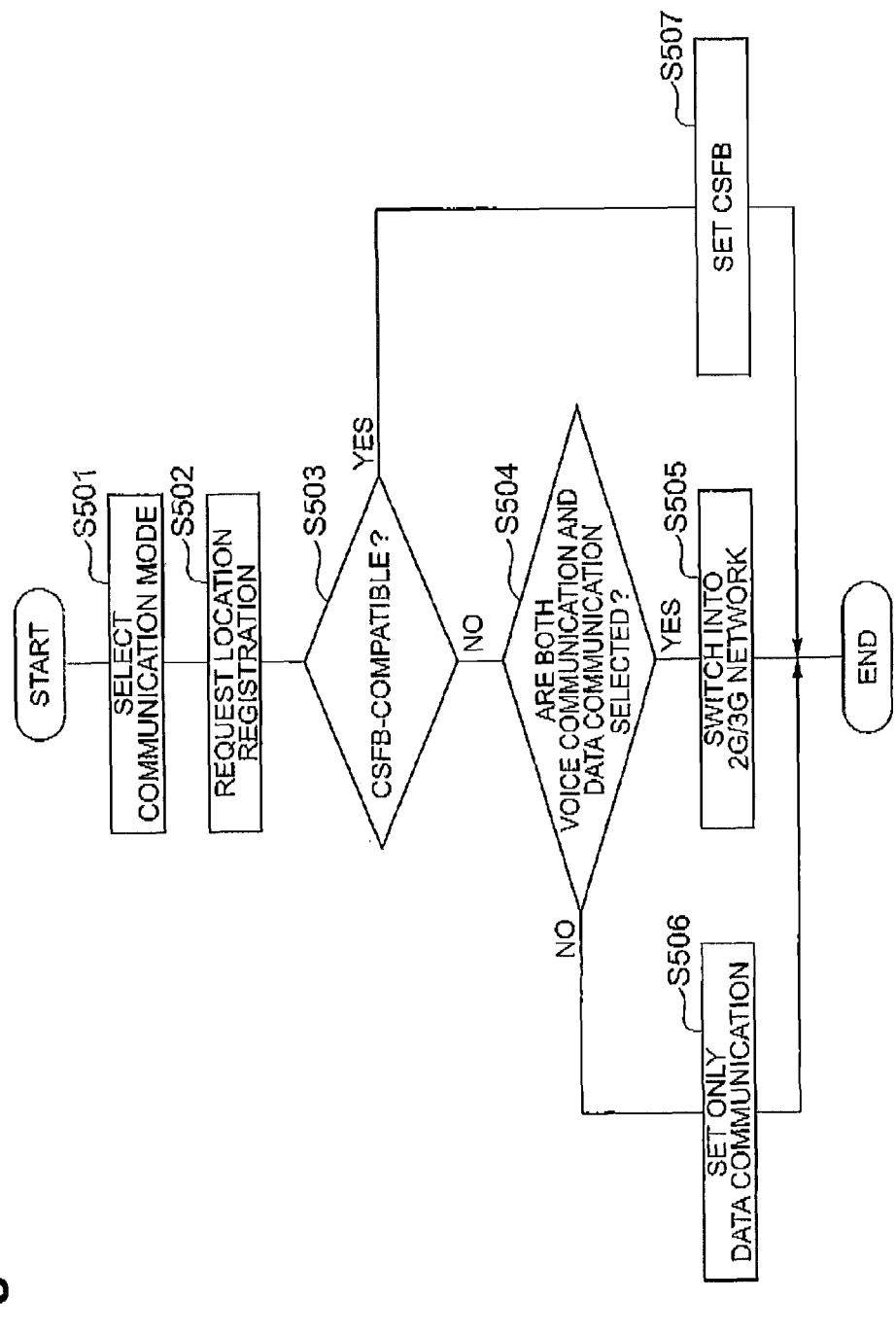
FIG. 6 is a flow chart of a setting sequence for performing mode setting of the mobile communication terminal according to the first embodiment.

Here, with reference to FIG. 6, a process to decide to which network the mobile communication terminal 100 should be resident will be described for a case where roaming is performed and thereby it is unknown whether the location of the user of the mobile communication terminal 100 is in an area corresponding to the CSFB-compatible mobile communication system 1A or in an area corresponding to the CSFB-incompatible mobile communication system 1. FIG. 6 shows a flow chart of a mode setting process of the mobile communication terminal 100. In addition, the mobile communication terminal 100 has a function of being compatible with the CSFB-compatible mobile communication system 1A and a function of being individually compatible with each of the mobile communication networks 200 and 300.

First, in a case where the power of the mobile communication terminal 100 is turned on in a communication area or the like where the mobile communication terminal 100 can perform roaming, it is determined by receiving notification information in the mobile communication terminal 100 whether or not the mobile communication system includes the both mobile communication networks 200 and 300. In a case where it is determined as a mobile communication system including the both communication networks 200 and 300, the CSFB-incompatible network permission setting unit 110 displays on a display two choices such as whether a communication mode where only a data communication can be performed is selected and whether a communication mode where both data communication and voice communication can be performed is selected as a communication mode of the mobile communication terminal 100. When one of the communication modes is selected according to a user's operation with respect to the display, the setting information selected by the selection is stored by the CSFB-incompatible network permission setting unit 110 (S501). In addition, the setting information is output to the location registration determination unit 140. In addition, the above-described setting may be performed in advance.

After the setting information with respect to the selection of the communication mode in step S501 is stored, subsequently, the request for location registration of the mobile communication terminal 100 is made, by the location registration request unit 120, to a mobile communication system including the both mobile communication networks 200 and 300 (step S502). When the location registration response receiving unit 130 receives the location registration response corresponding to the location registration request made by the location registration request unit 120 from a mobile communication system including the both mobile communication networks 200 and 300, a line identifier included in the location registration response is extracted by the location registration determination unit 140.

When the extracted line identifier includes only the line identifier of the E-UTRAN, the location registration determination unit 140 determines that the location is in an area corresponding to the CSFB-incompatible mobile communication system 1. Also when the extracted line identifier includes the both line identifiers of the UTRAN and GERAN and the E-UTRAN, the location registration determination unit 140 determines that the location is in an area corresponding to the CSFB-compatible mobile communication system 1A (S503).

As a determination result in step S503, when the area is determined as an area corresponding to the CSFB-incompatible mobile communication system 1, it proceeds to step S504, and the location registration determination unit 140 confirms the selected information set in the CSFB-incompatible network permission setting unit 110. When the selected information is determined as selected information for selecting a communication mode where the both data communication and the voice communication can be performed, the process proceeds to step S505, and the first mobile communication network switching control unit 150 performs a switching control for switching the mobile communication network in which the mobile communication terminal 100 is resident to the 2G/3G network 200 and sets it (S505).

On the other hand, when the selected information confirmed by the location registration determination unit 140 is determined, for example, as selected information for selecting a communication mode where only data communication is performed, the process proceeds to step S506, and the mode is registered as a mode to be resident in the 3.9G network 300 to perform only data communication (S506). In addition, as a determination result in step S503, when the area is determined as an area corresponding to CSFB-compatible mobile communication system 1A, the process proceeds to step S507, and the mobile communication terminal 100 is registered to be resident in 3.9G network in a case of performing data communication and to be resident in 2G/3G network by performing the CSFB in a case of performing a voice call, regardless of the selected information set in the CSFB-incompatible network permission setting unit 110.

After the switching control causing the mobile communication terminal 100 to be resident in the 2G/30 network 200 is performed in step S505, the mobile communication terminal 100 moves from a wireless network managed by one MSC/VLR 200 to a wireless network managed by an adjacent MSC/VLR 220, a re-switching indication signal causing the mobile communication terminal 100 to be resident in 3.9G network is transmitted from the subscriber accommodation station 400 to the mobile communication terminal 100. When the mobile communication terminal 100 receives the re-switching indication signal, in the related art, the second mobile communication network switching control unit 160 performs a process of re-switching the mobile communication network in which the mobile communication terminal is resident to the 3.9G network 300. However, in this embodiment, the switching indication signal discarding unit 175 of the resident prohibition unit 170 discards the re-switching indication signal. In addition, when the communication function switching unit 180 is used when needed, the communication function of the mobile communication terminal 100, which uses the 3.9G network, is switched into an off-state from an on-state. The mobile communication terminal 100 of which the communication function is switched into an off state may not receive any notification information from the 3.9G network 300 and thereby the reception of the re-switching signal is stopped. As a result, the mobile communication terminal 100 can be continuously and stably resident in the 2G/3G network 200.

According to this embodiment, due to the above-described configuration, the first mobile communication network switching control unit 150 can perform the switching control of the mobile communication network, which causes the mobile communication terminal 100 to be resident in the 2G/3G network 200. Due to such switching control, without being resident in the 3.9G network 300 of which location registration is preferentially performed at the time of performing a data communication, the mobile communication terminal 100 can perform the switching of the mobile communication network to be resident in the 2G/3G network 200 of which location registration is not performed at that time, such that the mobile communication terminal 100 can perform not only the data communication but also the voice call. That is, with respect to the mobile communication system 1 in which a case where it is impossible to receive the voice call service may be present like a CSFB-incompatible case, the CSFB-compatible mobile communication terminal 100 can suitably receive the voice call service.

In addition, according to this embodiment, due to the above-described configuration, it is possible to simply determine whether or not the 3.9G network 300 is a CSFB-compatible mobile communication network, by using existing information.

Second Embodiment

Hereinafter, a second embodiment of the invention will be described. This embodiment is different from the first embodiment in that it is determined whether or not a plurality of mobile communication systems including the 3.9G network 300 is a CSFB-incompatible mobile communication network by using notification information from the 3.9G network 300. First, a mobile communication network in which a mobile communication terminal 600 according to this embodiment can receive a voice call service and a data communication service will be described with reference to FIGS. 1 and 2.

First, the CSFB-compatible mobile communication system 1B will be described. As shown in FIG. 1, the mobile communication system 1B according to this embodiment is the same as the mobile communication system 1A of the first embodiment except for a wireless network 310B, and includes both mobile communication networks of the 2G/3G network 200 including a wireless network 210, an MSC/VLR 220A and a subscriber accommodation station 400, and the 3.9G network 300 including a wireless network 310B, an MME 320A and a subscriber accommodation station 400. Each of a wireless base station making up the wireless network 210 and a wireless base station making up the wireless network 310B has a function of transmitting notification information that is necessary for a mobile communication terminal 600 at the time of a location registration.

The notification information transmitted from the both wireless networks 210 and 310B includes a country number, a provider ID and the base station information. The country number is a number representing a country in which the base station is located (or a service is provided), the provider ID is code information representing a communication provider providing a communication service, and the base station information is identification information for specifying a plurality of base stations. In addition, network switching possibility information representing that the 3.9G network 300 is a CSFB-compatible mobile communication network (switchable mobile communication network) is included in the notification information transmitted from each wireless base station of the wireless network 310B of this embodiment, in addition to the above-described country number, the provider ID and the base station information, differently from the first embodiment. The network switching possibility information is information representing that the 3.9G network 300 is a switchable mobile communication network where the mobile communication network can be switched for a residence in 2G/3G network 200 at the time of receiving a calling of a voice call during being resident in the 3.9G network 300, and is realized, for example, by including a predetermined flag into the notification information.

Next, a CSFB-incompatible mobile communication system 1 will be described. As shown in FIG. 2, the mobile communication system 1 according to this embodiment has the same configuration as that of the mobile communication system 1 of the first embodiment. As is the case with the CSFB-compatible mobile communication system 1B, in CSFB-incompatible mobile communication system 1, notification information including a country number, a provider ID and a base station information is transmitted from each of base station making up the both wireless networks 210 and 310. In notification information transmitted from each base station making up the wireless network 310, there is not included network switching possibility information representing that the 3.9G network 300 is CSFB-compatible mobile communication network. In addition, notification information transmitted from each base station making up the wireless networks 310B and 310 includes network information representing the function of the 3.9G network 300. The network information corresponds to the location registration response signal transmitted from the MME 320A of the first embodiment.

Figure 7:
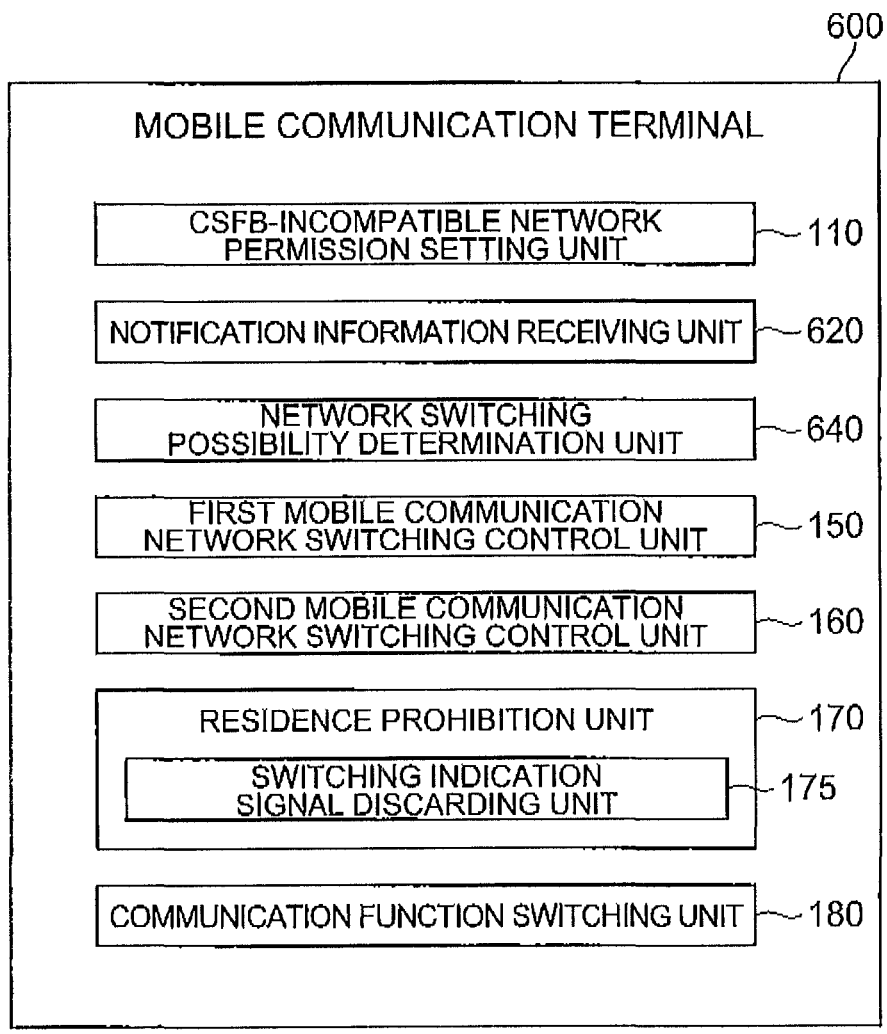
FIG. 7 a schematic configuration diagram illustrating a mobile communication terminal according to a second embodiment.

Subsequently, the CSFB-compatible mobile communication terminal 600 will be described. In addition, as shown in FIG. 3, a hardware configuration of the mobile communication terminal 600 is the same as that of the first embodiment. FIG. 7 shows a schematic configuration diagram of a mobile communication terminal 600. As shown in FIG. 7, the mobile communication terminal 600 functionally includes a CSFB-incompatible network permission setting unit 110, a notification information receiving unit (receiving means) 620, a network switching possibility determination unit (switching possibility determination means) 640, a first mobile communication network switching control unit 150, a second mobile communication network switching control unit 160, a residence prohibition unit 170, and a communication function switching unit 180. In addition, the residence prohibition unit 170 includes a switching indication signal discarding unit (switching indication signal discarding means) 175.

The notification information receiving unit 620 receives notification information from the both mobile communication networks 200 and 300. The notification information receiving unit 620 receives both notification information transmitted from each wireless base station making up the 2G/3G network 200 and notification information transmitted from each wireless base station making up the 3.9G network 300. The notification information receiving unit 620 that received the notification information transmits both sets of notification information to a location registration unit (not shown) that performs a location registration of the mobile communication terminal 600, and transmits only the notification information transmitted from the 3.9G network 300 to the network switching possibility determination unit 640.

The network switching possibility determination unit 640 determines whether or not the mobile communication terminal 600 is resident in the CSFB-incompatible mobile communication system 1 based on notification information transmitted from the 3.9G network 300. When receiving notification information transmitted from the 3.9G network 300 via the notification information receiving unit 620, the network switching possibility determination unit 640 confirms whether or not network switching possibility information, which represents the network is a CSFB-compatible mobile communication network, is included in the received notification information. The network switching possibility determination unit 640 determines the 3.9G network 300 as a CSFB-compatible mobile communication network in a case where the network switching possibility information is included in the notification information. Also the network switching possibility determination unit 640 determines the 3.9G network 300 as a CSFB-incompatible mobile communication network in a case where the network switching possibility information is not included in the notification information.

The network switching possibility determination unit 640 outputs the determination result of whether or not it is compatible with a CSFB to a first mobile communication network switching control unit 150 and the location registration unit. When receiving the determination result of CSFB-incompatibility, the first mobile communication network switching control unit 150 transmits a switching indication signal for compulsory switching into the 2G/3G network 200 to the resident 3.9G network 300 to perform a switching control process of a mobile communication network. On the other hand, when receiving the determination result of CSFB-compatibility, the first mobile communication network switching control unit 150 does not perform the switching control process of the mobile communication network. In addition, the location registration unit to which the determination result of whether or not the network is compatible with the CSFB is input, in a case where the network is determined as a CSFB-compatible mobile communication network, extracts an identification information (location information) of each of a base station related to the 2G/3G network 200 and a base station related to the 3.9G network 300, transmits an inherent identification number of the terminal to the both base stations specified by the identification information and performs the location registration for a wireless communication in the both mobile communication networks. On the other hand, in a case where the network is determined as a CSFB-incompatible mobile communication network, the location registration unit, in response to a mode setting in the CSFB-incompatible network permission setting unit 110, extracts an identification information of a base station related to the 2G/3G network 200 when both data communication and a voice call are performed and an identification information of a base station related to the 3.9G network 300 when only high-speed data communication is performed. Then the mobile communication terminal 600 transmits an inherent identification number of the terminal to the base station specified by the extracted identification information, and the location registration for a wireless communication in one mobile communication network is performed.

Figure 8:
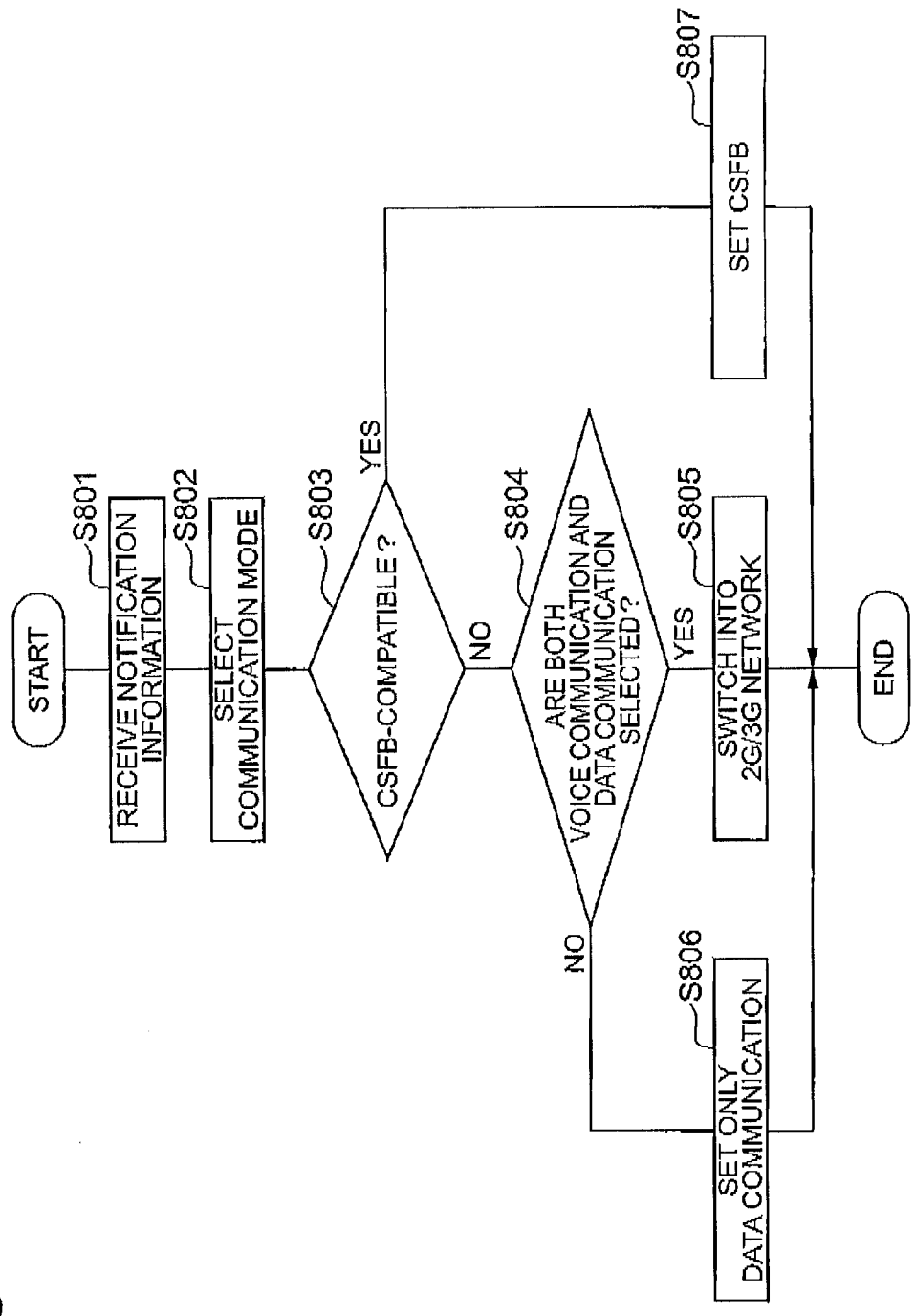
FIG. 8 is a flow chart of a setting sequence for performing mode setting of the mobile communication terminal according to the second embodiment.
Figure 9:
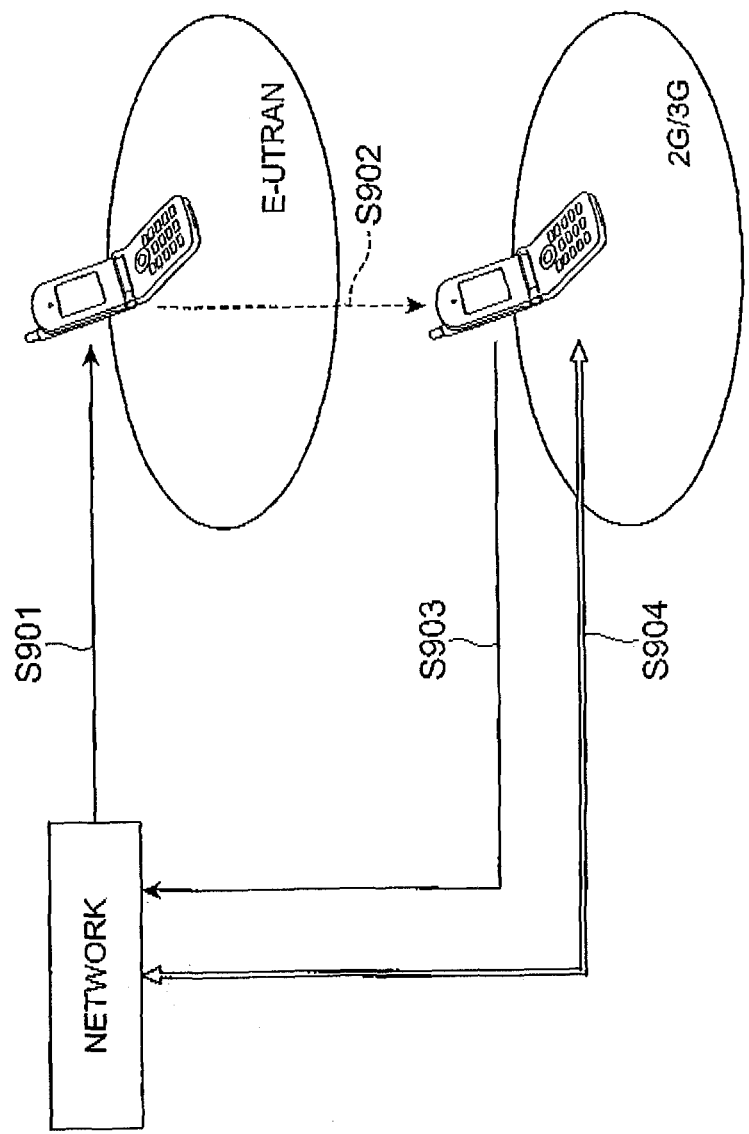
FIG. 9 is a schematic configuration diagram illustrating the operation of a CSFB.

Here, in a case where roaming is performed and thereby it is unknown that the location of the user of the mobile communication terminal 600 is in an area corresponding to the CSFB-compatible mobile communication system 1B or an area corresponding to the CSFB-incompatible mobile communication system 1, a process of causing the mobile communication terminal 600 to be resident in any network will be described with reference to FIG. 8. FIG. 8 shows a flow chart of a mode setting process of the mobile communication terminal 600.

First, in a case where the power of the mobile communication terminal 600 is turned on in a communication area or the like where the mobile communication terminal 600 can perform roaming, the notification information receiving unit 620 of the mobile communication terminal 600 receives notification information from the 2G/3G network 200 and notification information from the 3.9G network 300 (S801). The notification information receiving unit 620 that received the notification information transmits both sets of the received notification information to a location registration unit, and transmits only the notification information transmitted from the 3.9G network 300 to the network switching possibility determination unit 640. When both sets of the notification information are received, the mobile communication system is determined to include the both mobile communication networks 200 and 300.

Then, in a case where it is determined as a mobile communication system including the both communication networks 200 and 300, the CSFB-incompatible network permission setting unit 110 displays on a display two choices such as whether a communication mode where only a data communication can be performed is selected and whether a communication mode where both data communication and voice communication can be performed is selected as a communication mode of the mobile communication terminal 600. When any communication mode is selected according to a user's operation with respect to the display, the setting information selected by the selection is stored by the CSFB-incompatible network permission setting unit 110 (S802). In addition, the setting information is output to the network switching possibility determination unit 640. In addition, the above-described setting may be performed in advance.

After the network switching possibility determination unit 640 receives notification information from the 3.9G network 300, the network switching possibility determination unit 640 confirms whether network switching possibility information representing the CSFB-compatible mobile communication network is included in the notification information transmitted from the 3.9G network 300. As a result of the confirmation, in a case where the network switching possibility information is not included in the notification information, it is determined as an area corresponding to the CSFB-incompatible mobile communication system 1B by the network switching possibility determination unit 640. In a case where the network switching possibility information is included in the notification information, it is determined as an area corresponding to the CSFB-compatible mobile communication system 1 by the network switching possibility determination unit 640 (S803).

As a determination result in step S803, when it is determined as an area corresponding to the CSFB-incompatible mobile communication system 1, the process proceeds to step S804, and the network switching possibility determination unit 640 confirms the selected information set in the CSFB-incompatible network permission setting unit 110. If the selected information is determined as selected information for selecting a communication mode where the both data communication and the voice communication can be performed, the process proceeds to step S805, and the first mobile communication network switching control unit 150 performs a switching control for switching the mobile communication network in which the mobile communication terminal 600 is resident to the 2G/3G network 200 and sets it (S805).

On the other hand, when the selected information confirmed by the network switching possibility determination unit 640 is determined as selected information for selecting a communication mode where only data communication is performed, the process proceeds to step S806, and a location registration is performed to be resident in the 3.9G network 300 and the mode is registered to perform only data communication (S806). In addition, as a determination result in step S803, when the area is determined as an area corresponding to the CSFB-compatible mobile communication system 1B, the process proceeds to step S807, and a location registration is performed to be resident in a 3.9G network in a case of performing data communication and a location registration is performed to be resident in a 2G/3G network by performing the CSFB in a case of performing a voice call, regardless of the selected information set in the CSFB-incompatible network permission setting unit 110. In addition, a process after the switching control causing the mobile communication terminal 600 to be resident in the 2G/3G network 200 is performed in step S805 is the same as that of the first embodiment.

According to this embodiment, due to the above-described configuration, the first mobile communication network switching control unit 150 can perform the switching control causing the mobile communication terminal 600 to be resident in the 2G/3G network 200. Due to such switching control, without being resident in the 3.9G network 300 of which location registration is preferentially performed at the time of performing a data communication, the mobile communication terminal 600 can perform the switching of the mobile communication network to be resident in the 2G/3G network 200 of which location registration is not performed at that time, such that the mobile communication terminal 600 can perform not only the data communication but also the voice call. That is, with respect to the mobile communication network in which a case where it is impossible to receive the voice call service may be present like a CSFB-incompatible case, the CSFB-compatible mobile communication terminal 600 can suitably receive the voice call service. In addition, the network switching possibility determination unit 640 determines whether or not the 3.9G network 300 is a CSFB-compatible mobile communication network based on the notification information, such that it is possible to quickly and simply determine whether or not the 3.9G network 300 is a CSFB-compatible mobile communication network, by using existing information.

Hereinbefore, the invention is described in detail based on embodiments thereof, but the invention is not limited to the above-described embodiments. For example, in the first embodiment, whether it is the CSFB-incompatible mobile communication system 1 or not is determined according to whether or not the location registration response in response to the location registration request includes the line identifier of the E-UTRAN and the line identifiers of the UTRAN and GERAN, but it may be determined according to whether or not other information representing a CSFB-incompatible mobile communication network is included in the location registration response in response to the location registration request.

In addition, in the above-described embodiments, in a case where a mobile communication system is determined as the CSFB-incompatible mobile communication system 1, the first mobile communication network switching control unit 150 performs a switching control by which the network is automatically switched into a 2G/30 network, but the switching control may be manually performed (Manual PLMN Selection). In this case, the mobile communication terminals 100 and 600 include: a notification unit that notifies a user of the mobile communication terminals 100 and 600 of the determination of whether or not the mobile communication terminals 100 and 600 completed the location registration only in the 3.9G network 300, which is performed by the location registration determination unit, and the determination of whether or not the 3.9G network 300 is a switchable mobile communication network, which is performed by the network switching possibility determination unit; and an input receiving unit that receives, from the user, an input indicating whether or not the witching control of the mobile communication network for causing the mobile communication terminals 100 and 600 to be resident in the 2G/3G network 200 is to be performed, in response to the notification by the notification unit. The above-described notification is performed, for example, by displaying "if you do not perform, a switching control, you may not perform a voice call". When the input receiving unit receives an input from the user, which indicates that a switching control of a mobile communication network needs to be performed so as to cause the mobile communication terminals 100 and 600 to be resident in the 2G/3G network 200, the first mobile communication network switching control unit 150 of the mobile communication terminals 100 and 600 performs the switching control of the mobile communication network to cause the mobile communication terminals 100 and 600 to be resident in the 2G/3G network 200. As a result, the switching into the 2G/3G network in the mobile communication terminals 100 and 600 can be selected by a user of the mobile communication terminals 100 and 600. In addition, in the above-described embodiments, description is given with respect to the CSFB, but the mobile communication terminals 100 and 600 may be applied to other cases without departing from the scope of the invention and are not limited to the CSFB case.

The invention claimed is:

1. A mobile communication terminal adapted to be selectively resident in both a first mobile communication network where a data communication and a voice call can be performed and a second mobile communication network where data communication faster than in the first mobile communication network can be performed, the mobile communication terminal being set to be preferentially resident in the second mobile communication network in a case where the data communication is performed and being adapted to switch the mobile communication network so as to be resident in the first mobile communication network in a case where the voice call is performed, the mobile communication terminal comprising:

a receiver that receives network information representing a function of the second mobile communication network from the second mobile communication network;

a switching possibility determiner that determines that, based on the network information received by the receiver whether or not the second mobile communication network is a switchable mobile communication network where the mobile communication terminal can switch the mobile communication network so as to be resident in the first mobile communication network in a case of receiving a calling of a voice call during being resident in the second mobile communication network;
a first mobile communication network switching controller configured to perform the switching control of the mobile communication network; and
a residence prohibiter that causes the mobile communication terminal to remain resident in the first mobile communication network and prohibits the mobile communication terminal from residing in the second mobile communication network when the switching possibility determiner determines that the second mobile communication network is not the switchable communication network.

2. The mobile communication terminal according to claim 1, further comprising:
a location registration requester that makes a request for a location registration in each of the mobile communication networks to the second mobile communication network,
wherein the receiver receives, as the network information, a location registration response representing a result of the location registration in the both mobile communication networks in response to the request for the location registration made by the location registration requester, and
the switching possibility determiner determines that the second mobile communication network is not a switchable mobile communication network, in a case where the location registration response, which is received by the receiver, represents that only the second mobile communication network completed the location registration between the both mobile communication networks.

3. The mobile communication terminal according to claim 1,
wherein the receiver receives notification information that is the network information from the second mobile communication network, and
the switching possibility determiner determines whether or not the second mobile communication network is the switchable mobile communication network, based on the notification information received by the receiver.

4. The mobile communication terminal according to claim 1, further comprising:
a notifier that notifies a user of the mobile communication terminal of the determination by the switching possibility determiner, which represents that the second mobile communication network is not the switchable mobile communication network; and
an input receiver that receives an input indicating whether or not the switching control of the mobile communication network for causing the first mobile communication terminal to be resident in the first mobile communication network needs to be performed in response to the notification by the notifier,
wherein, when the input receiver receives an input indicating that the switching control of the mobile communication network needs to be performed so as to cause the mobile communication terminal to be resident in the first mobile communication network, the first mobile communication network switching controller performs the switching control of the mobile communication network to cause the mobile communication terminal to be resident in the first mobile communication network.

5. The mobile communication terminal according to claim 1, further comprising:
a second mobile communication network switching controller that receives, from the first mobile communication network, a switching indication signal indicating a switching from the first mobile communication network to the second mobile communication network, and performs a switching control of the mobile communication network to cause the mobile communication terminal to be resident in the second mobile communication network, based on the switching indication signal,
wherein the residence prohibiter includes a switching indication signal discarder that discards the switching indication signal received by the second mobile communication network switching controller, before the second mobile communication network switching controller performs the switching control of the mobile communication network.

6. The mobile communication terminal according to claim 1, further comprising:
a communication function switcher that can switch the communication function of the mobile communication terminal, which uses the second mobile communication network, into an off state, in a case where the switching possibility determiner determines that the second mobile communication network is not the switchable mobile communication network.

7. The mobile communication terminal according to claim 1, further comprising:
a selector that selects and sets a communication mode where only the data communication can be performed or a communication mode where the both data communication and the voice call can be performed, and causes only the data communication through the second mobile communication network to be performed when the communication mode where only the data communication can be performed is set.

8. The mobile communication terminal according to claim 2, further comprising:
a notifier that notifies a user of the mobile communication terminal of the determination by the switching possibility determiner, which represents that the second mobile communication network is not the switchable mobile communication network; and
an input receiver that receives an input indicating whether or not the switching control of the mobile communication network for causing the first mobile communication terminal to be resident in the first mobile communication network needs to be performed in response to the notification by the notifier,
wherein, when the input receiver receives an input indicating that the switching control of the mobile communication network needs to be performed so as to cause the mobile communication terminal to be resident in the first mobile communication network, the first mobile communication network switching controller performs the switching control of the mobile communication network to cause the mobile communication terminal to be resident in the first mobile communication network.

9. The mobile communication terminal according to claim 3, further comprising:
a notifier that notifies a user of the mobile communication terminal of the determination by the switching possibility determiner, which represents that the second mobile communication network is not the switchable mobile communication network; and
an input receiver that receives an input indicating whether or not the switching control of the mobile communication network for causing the first mobile communication terminal to be resident in the first mobile communication network needs to be performed in response to the notification by the notifier, wherein, when the input receiver receives an input indicating that the switching control of the mobile communication network needs to be performed so as to cause the mobile communication terminal to be resident in the first mobile communication network, the first mobile communication network switching controller performs the switching control of the mobile communication network to cause the mobile communication terminal to be resident in the first mobile communication network.

10. The mobile communication terminal according to claim 2, further comprising:
a communication function switcher that can switch the communication function of the mobile communication terminal, which uses the second mobile communication network, into an off state, when the switching possibility determiner determines that the second mobile communication network is not the switchable mobile communication network.

11. The mobile communication terminal according to claim 3, further comprising:
a communication function switcher that can switch the communication function of the mobile communication terminal, which uses the second mobile communication network, into an off state, when the switching possibility determiner determines that the second mobile communication network is not the switchable mobile communication network.

12. The mobile communication terminal according to claim 4, further comprising:
a communication function switcher that can switch the communication function of the mobile communication terminal, which uses the second mobile communication network, into an off state, when the switching possibility determiner determines that the second mobile communication network is not the switchable mobile communication network.

13. The mobile communication terminal according to claim 6, further comprising:
a communication function switcher that can switch the communication function of the mobile communication terminal, which uses the second mobile communication network, into an off state, when the switching possibility determiner determines that the second mobile communication network is not the switchable mobile communication network.

14. A mobile communication terminal that can be selectively resident in both a first mobile communication network where a data communication and a voice call can be performed and a second mobile communication network where data communication faster than in the first mobile communication network can be performed, the mobile communication terminal being set to be preferentially resident in the second mobile communication network in a case where the data communication is performed and being adapted to switch the mobile communication network so as to be resident in the first mobile communication network in a case where the voice call is performed, the mobile communication terminal comprising:
a location registration requester that makes a request for a location registration in each of the both mobile communication networks to the second mobile communication network;
a location registration response receiver that receives a location registration response representing a result of the location registration in the both mobile communication networks in response to the request for the location registration made by the location registration requester;
a location registration determiner that determines whether or not the location registration only in the second mobile communication network between the both mobile communication networks is completed, based on the location registration response received by the location registration response receiver;
a first mobile communication network switching controller configured to perform a switching control of the mobile communication network;
a residence prohibiter that causes the mobile communication terminal to remain resident in the first mobile communication network and prohibits the mobile communication terminal from residing in the second mobile communication network when the location registration determiner determines that the location registration only in the second mobile communication network is completed.

* * * * *